US009446536B2

(12) United States Patent
Marinov (10) Patent No.: US 9,446,536 B2
(45) Date of Patent: Sep. 20, 2016

(54) MITER SAW REAR GUARD

(71) Applicants: Robert Bosch Tool Corporation, Broadview, IL (US); Robert Bosch GmbH, Stuttgart (DE)

(72) Inventor: Plamen V. Marinov, Mount Prospect, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 77 days.

(21) Appl. No.: 14/206,069

(22) Filed: Mar. 12, 2014

(65) Prior Publication Data

US 2014/0260860 A1    Sep. 18, 2014

Related U.S. Application Data

(60) Provisional application No. 61/787,892, filed on Mar. 15, 2013.

(51) Int. Cl.
*B27G 19/02* (2006.01)
*B23D 45/04* (2006.01)

(52) U.S. Cl.
CPC ............. *B27G 19/02* (2013.01); *B23D 45/048* (2013.01); *Y10T 83/606* (2015.04)

(58) Field of Classification Search
CPC .. B23D 45/048; B27G 19/02; Y10T 83/606; Y10T 83/613; Y10T 83/7734; Y10T 83/7693; Y10T 83/8773; Y10T 83/7788; B27B 5/29
USPC ............................ 83/397, 397.1, 471.2, 581, 83/471.1–471.3, 483–490, 473, 477.2, 391
See application file for complete search history.

(56) References Cited

U.S. PATENT DOCUMENTS

| 3,998,121 | A | * | 12/1976 | Bennett ...................... 83/471.3 |
| 5,931,072 | A | * | 8/1999 | Shibata ........................... 83/98 |
| 2002/0189415 | A1 | | 12/2002 | Oktavec et al. |
| 2005/0247177 | A1 | * | 11/2005 | Hetcher ............... B23D 45/044 83/471.3 |
| 2006/0101965 | A1 | | 5/2006 | Carroll et al. |
| 2007/0221026 | A1 | | 9/2007 | Parks et al. |
| 2009/0235795 | A1 | | 9/2009 | Aoyama |
| 2014/0020539 | A1 | * | 1/2014 | Ginocchini et al. ......... 83/471.2 |

FOREIGN PATENT DOCUMENTS

EP          2253439 A1    11/2010

OTHER PUBLICATIONS

International Search Report and Written Opinion corresponding to PCT Application No. PCT/US2014/024747, mailed Aug. 29, 2014 (11 pages).

* cited by examiner

*Primary Examiner* — Ghassem Alie
(74) *Attorney, Agent, or Firm* — Maginot Moore & Beck LLP (57) ABSTRACT

A safety component is provided for a power saw that includes a rear guard pivotably mounted to the saw assembly. The rear guard is generally U-shaped to straddle the cutting blade in a deployed position. The rear guard includes arms that contact the workpiece during the cutting operation so that as the saw blade moves downward to perform the cut the rear guard pivots upward while maintaining protection of the rear portion of the saw blade.

8 Claims, 7 Drawing Sheets

FIG. 8

MITER SAW REAR GUARD

REFERENCE TO RELATED APPLICATION AND PRIORITY CLAIM

This application is a non-provisional filing of and claims priority to co-pending provisional application No. 61/787,892, filed on Mar. 15, 2014, the disclosure of which is incorporated herein in its entirety.

FIELD OF THE DISCLOSURE

The present disclosure relate to bench top saw power tools, such as bench top miter saws, and particularly to safety devices for such power tools.

BACKGROUND

Figure 1:
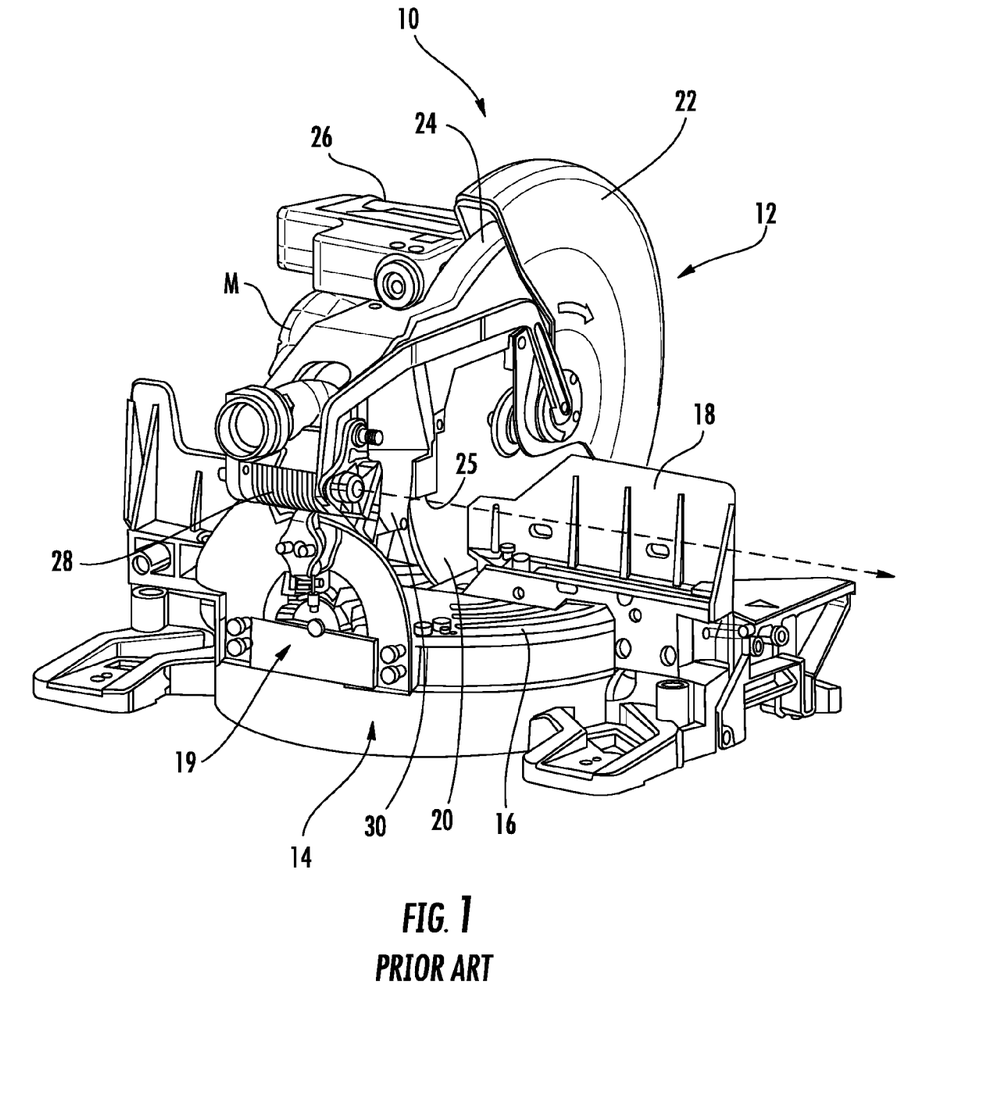
FIG. 1 is a perspective view of a miter saw power tool for use with the rear guard of the present disclosure.
Figure 5:
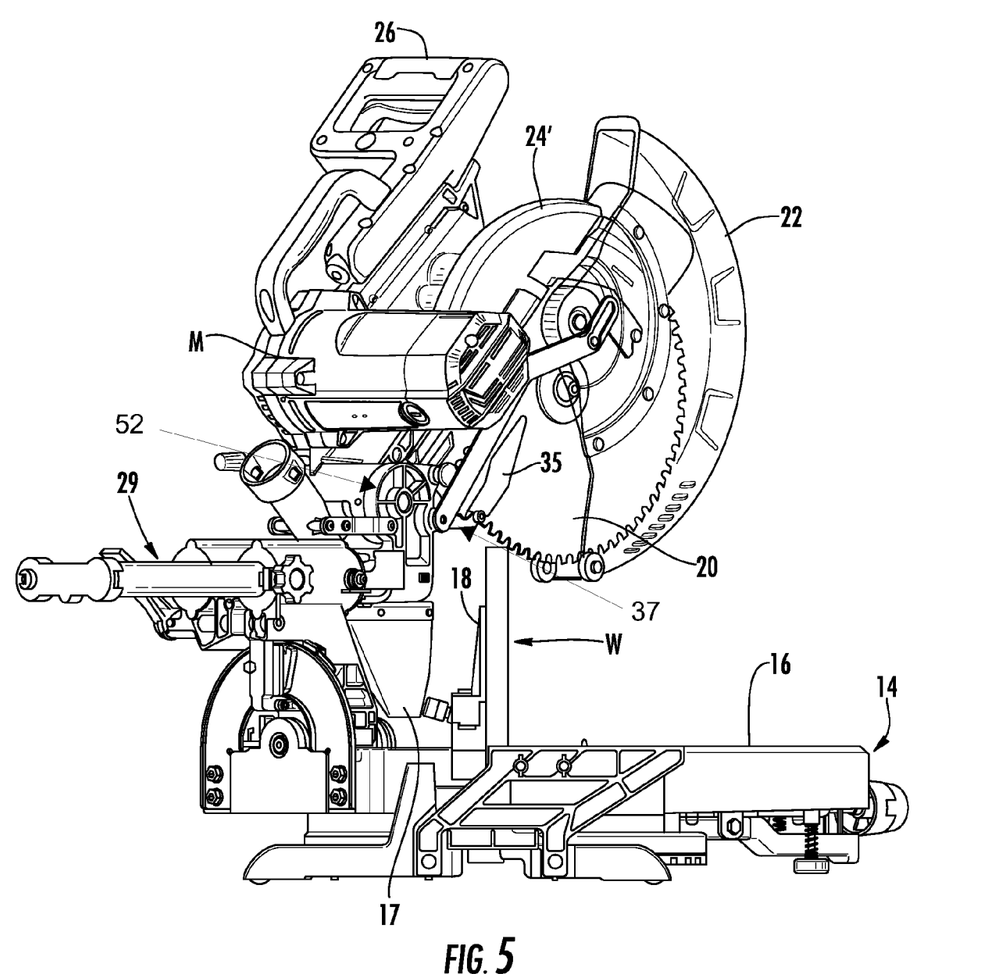
FIG. 5 is a rear perspective view of a power tool, such as the power tool of FIG. 1, with a saw assembly incorporating the rear guard, such as the assembly shown in FIG. 2, in which the saw assembly is pivoted upward prior to contacting a workpiece.
Figure 6:
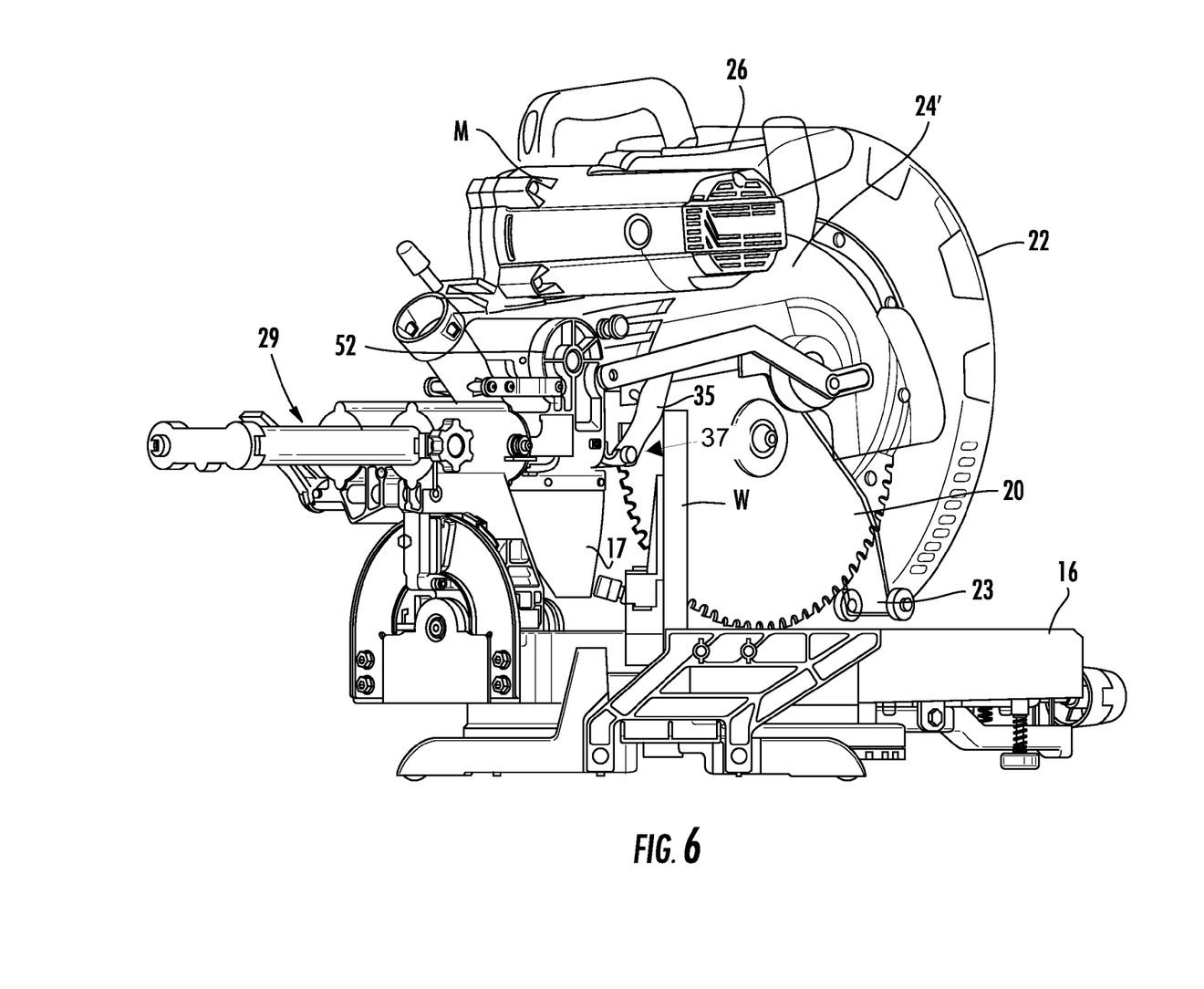
FIG. 6 is the rear perspective view shown in FIG. 5, in which the saw assembly is pivoted downward performing a cut on the workpiece.

One example of a bench top miter saw power tool 10 is shown in FIG. 1. The miter saw includes a saw assembly 12 supported on a platform assembly 14. The platform assembly defines a work surface 16 for supporting a workpiece, and a guide fence assembly 18 for supporting the workpiece during a cutting operation. The platform assembly also includes an adjustment mechanism for adjusting the height, miter angle and/or bevel angle of the saw assembly 12. The saw assembly 12 further includes a saw blade 20 that is supported by an arm assembly 24. The arm is also configured as an upper guard to cover the top portion of the cutting zone formed by the rotating blade 20. The arm assembly 24 supports the drive motor assembly M and a handle mechanism 26 and is mounted to the platform assembly 14 at an arm pivot mount 28 between the arm assembly 24 and a support structure of the platform assembly. The pivot mount may be configured to bias the saw assembly to a raised orientation, as shown in FIG. 5, which allows access to the work surface 16 to position a workpiece W for a miter cut. The arm pivot mount 28 allows the operator to manually pivot the saw assembly downward, by way of the handle 26, to perform the cut, as illustrated in FIG. 6.

Figure 2:
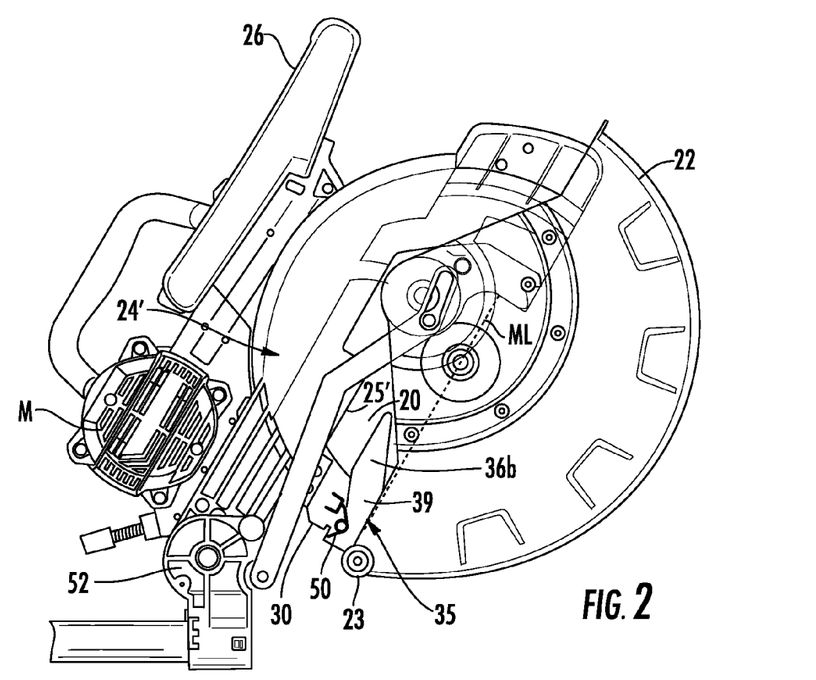
FIG. 2 is a side view of a saw assembly for a power tool such as shown in FIG. 1, with the saw assembly including a rear guard according to the present disclosure.

The saw assembly 12 includes a lower guard 22 that is pivotably mounted to the arm assembly 24 to cover the rear portion of the cutting zone, as shown in FIG. 1. The lower guard 22 envelops the arm assembly/upper guard 24 and pivots from a position fully encasing the saw blade, as shown in FIG. 2, to a position in which the lower guard substantially overlaps the arm assembly/upper guard 24, as shown in FIG. 1. The lower guard 22 may include a bushing 23 (FIG. 6) at its lower edge to contact the workpiece W when the saw assembly 12 is pivoted during a miter cut. A dust collection system 17 may be included in the power tool to collect dust and debris during a cut. As shown in FIGS. 5-6, the power tool may also include a slide assembly 29 having a yoke 52 that integrates with the arm 28 for the saw assembly. The yoke is horizontally movable relative to the platform so that the saw can be moved linearly across the workpiece.

Certain safety regulations require that the rear portion of the cutting zone (i.e., the portion adjacent the arm pivot mount 28 of the saw assembly 12) be covered by a non-removable guard. In prior power saws the rear edge 25 (FIG. 1) of the arm assembly/upper guard 24 extends below the midline of the saw blade in order to provide the desired blade protection. However, during procedures in which a tall workpiece is butted up to the fence 18, such as shown in FIG. 5, the bottom edge 25 of the upper guard can contact and interfere with the workpiece.

Consequently there is a need for a safety device for the rear portion of the cutting zone that meets the requirements for a non-removable guard but that does not interfere with the use of the power tool.

SUMMARY

The present disclosure contemplates safety component for a power saw having a platform for supporting a workpiece, a rotating cutting blade, an arm assembly supporting the cutting blade, an arm pivot mount pivotably supporting the arm assembly on the platform for pivoting the blade toward a workpiece supported on the platform, an upper guard on the arm assembly configured to protect the operator from the top portion of the cutting blade, and a lower guard configured to protect the operator from a rear portion of the cutting blade.

In one aspect, the safety component comprises a rear guard including a base portion and a pair of arms extending from the base portion and spaced apart to form a generally U-shape defining an opening for receiving the cutting blade between the arms. A pivot mount is configured to pivotably mount the rear guard to the arm assembly to receive a rear portion of the cutting blade adjacent the arm pivot mount when the rear guard is in a deployed position.

In a further aspect, each arm includes a shroud portion extending upward therefrom and configured to overlap at least a portion of the cutting blade when the rear guard is in the deployed position receiving the cutting blade. In another feature, at least one of the arms includes a finger extending generally radially outward from the pivot mount toward the cutting blade. The finger is sized and arranged to contact a workpiece supported on the platform, whereby as the cutting blade is pivoted downward onto the workpiece the finger and rear guard are pivoted upward

DETAILED DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

The present disclosure contemplates a saw assembly having protective or safety features modified from the assembly 12 shown in FIG. 1. In particular, the arm assembly/upper guard of the saw assembly is modified, as shown by the arm assembly 24' in FIGS. 2-3, to incorporate a safety component 35. In order to accommodate the safety component, in one aspect the rear lower edge 25' may be modified to be offset from the midline ML of the saw blade 20. The lower edge 25' is offset far enough upward so that the edge does not contact or interfere with a tall workpiece W positioned as shown in FIG. 5. In certain embodiments, the entire arm assembly 24' may be shifted upward with appropriate modifications to the lower guard 22.

Figure 3:
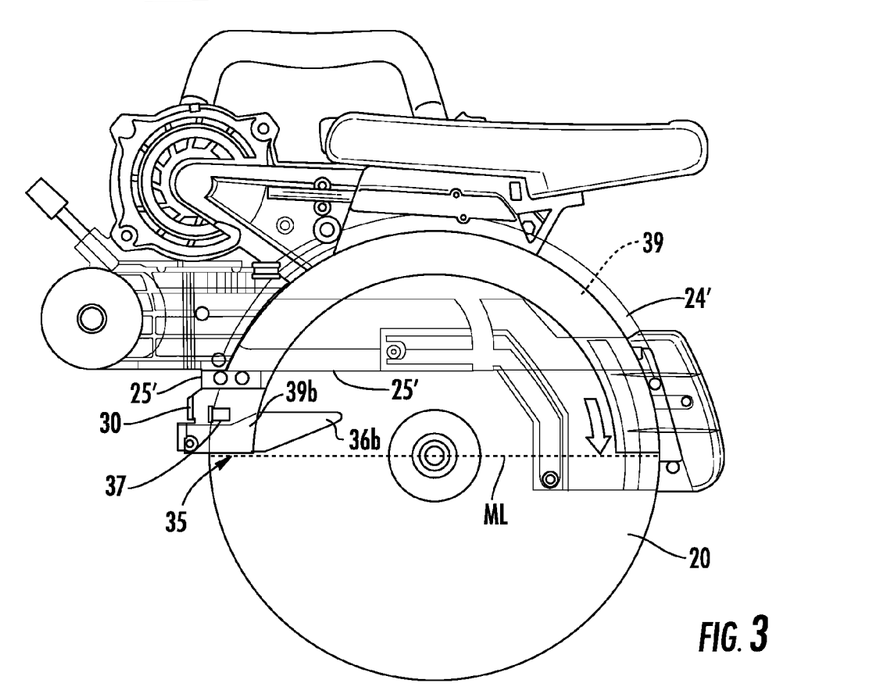
FIG. 3 is a side view of the saw assembly shown in FIG. 2 with the lower guard removed.
Figure 4A:
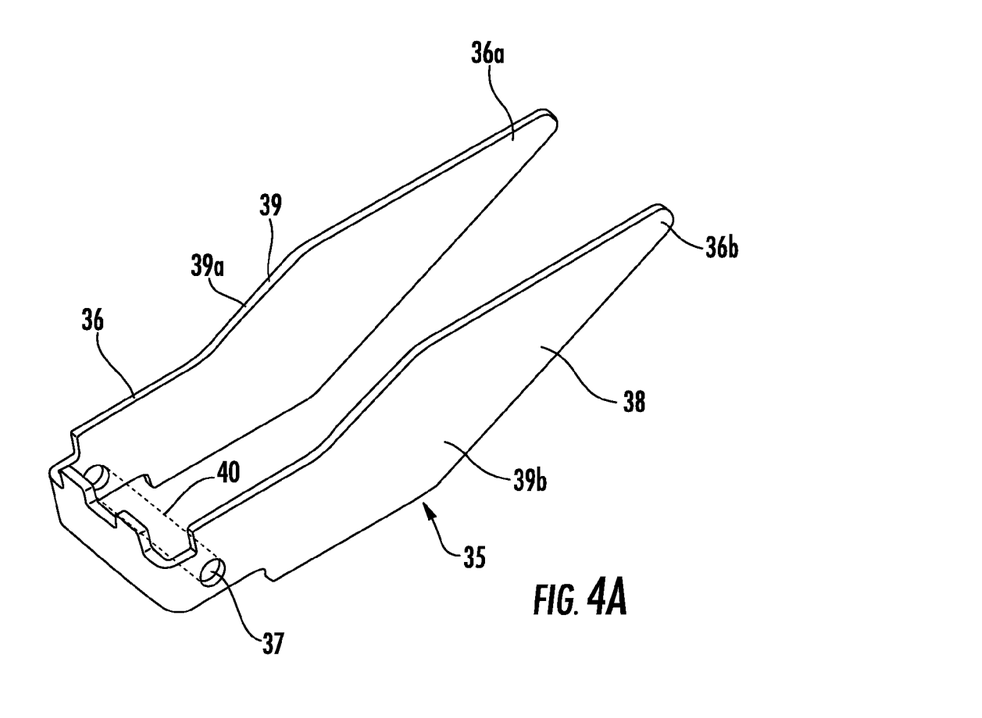
FIG. 4A is an enlarged perspective view of one embodiment of a rear guard used in the saw assembly of FIGS. 2-3.

In order to protect the rear portion of the cutting zone, the saw assembly includes a chip deflector 30 that is mounted to a rear portion of the arm assembly 24', as shown in FIGS. 2-3. The chip deflector is typically a component of a blade guard system and is operable to prevent large debris from entering other components of the blade guard. However, the chip deflector still leaves a gap that is unprotected. In accordance with the present disclosure, a rear guard 35 is provided that is configured to bridge that gap. As shown in FIG. 4A, the rear guard 35 includes a base portion 36 that is configured to fit with the lower end of the chip deflector 30 (FIG. 3). The base portion 36 is pivotably mounted to the chip deflector at a pivot mount 37. The rear guard 35 is generally U-shaped, with arms 36a, 36b extending from the base portion, the arms spaced apart to define an opening or slot toward the saw blade 22. Each arm 36a, 36b of the rear guard includes a shroud portion 39a, 39b that extends upward from the arm and is configured to help deflect chips and debris when the rear guard is in its deployed position shown in FIGS. 3, 5. The rear guard 35 is biased to the deployed position by a spring 50 (FIG. 2) that may be disposed about an axle 40 extending through the pivot mount 37. The spring 50 is configured to restore the rear guard 35 to the deployed position shown in FIGS. 3, 5.

It can be seen in FIG. 3 that the rear guard is sized so that its lower edge is aligned with the midline ML of the saw blade 20, thereby providing the requisite protection to meet safety regulations. However, unlike the upper guards of the prior art that interfere with a tall workpiece, the rear guard 35 includes a pair of retraction fingers 38 formed by the arms 36a, 36b extending radially outward relative to the pivot mount 37 toward the center of the saw blade 22. The fingers straddle the saw blade in the same manner as the shroud portion 39a, 39b on each arm. The fingers 38 are arranged to contact the workpiece W as the saw blade is lowered to the position shown in FIG. 6. The fingers are thus sized to extend from the base portion of the rear guard a distance for sufficient contact with the workpiece W as it is being cut by the saw blade. In one specific embodiment, the fingers can have a length sufficient to overlap the cutting blade by about two (2) inches when the rear guard is in the lowered position. When the rear guard is in the lowered position, continued downward movement of the saw assembly causes the rear guard to pivot about the pivot mount 37 against the force of the spring 50 by the continued contact of the fingers 38 with the workpiece W. It can be appreciated that as the fingers 38 pivot upward, the shroud portion 39 also pivots upward within the arm assembly 24'. The arm assembly is thus sized to permit limited movement of the shroud portion within the arm assembly. Once the cut is complete and the workpiece is removed, the rear guard 35 is pivoted back to its deployed position by the spring 50.

Figure 4B:
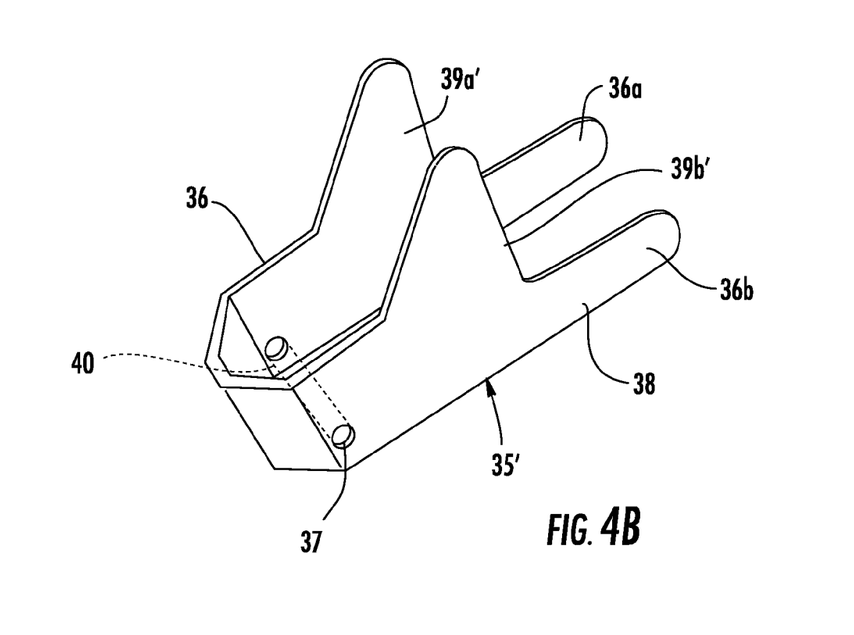
FIG. 4B is an enlarged perspective view of another embodiment of a rear guard usable with the saw assembly of FIGS. 2-3.

An alternative guard 35' is shown in FIG. 4B in which the arms 36a', 36b' are delineated from the shroud portions 39a', 39b'. In particular, the arms extend generally radially from the base portion 36 while the shroud portions 39a', 39b' extend generally perpendicular to the arms.

The rear guard 35 is formed of a stiff, durable and strong material. The rear guard material is preferably stiff enough to avoid being accidentally bent when the power tool is being set up for use by the operator. In one specific embodiment, the rear guard is formed from a 1/16 inch thick stainless steel sheet. The arms, shrouds and fingers can be readily stamped from the sheet and bent to the U-shaped configuration. The axle 40 may be a conventional steel pin. The biasing spring 50 may be a conventional coil, torsion or leaf spring.

In the illustrated embodiment, the rear guard is pivotably mounted and spring-biased to return to its deployed safety position in the absence of a workpiece. In a modified embodiment, the pivot mount 37 for the rear guard does not include the biasing spring. Instead, the rear guard may rely on gravity to cause the guard to pivot downward to its deployed position, even when the blade arm assembly is pivoted upward. In this modified embodiment, the fingers may be weighted to ensure that the rear guard will pivot downward. In another modified embodiment, the rear guard may be mounted to the chip deflector 30 to translate upward, or to move with a combination of translation and rotation, when the fingers 38 contact the workpiece.

According to the present disclosure, a rear guard is pivotably mounted to the chip deflector 30 which is itself mounted to the arm assembly 24, 24' supporting the cutting blade of a power tool. The rear guard is preferably non-removably mounted to the chip deflector so that the tool operator cannot circumvent the safety feature. In one aspect of the present disclosure, the rear guard 35 includes a pair of fingers that can contact a tall workpiece to pivot the rear guard upward and away from the workpiece while still retaining the guard in a shielding position. Upon removal of the workpiece the spring-biased rear guard pivots back to its deployed safety position. It can be appreciated that while the illustrated embodiment shows two fingers for contacting the workpiece W to pivot the rear guard, only one such finger is needed to contact the workpiece and pivot the entire rear guard 35 upward.

The shroud portion 39 on each arm 35a, 35b is configured to provide adequate shielding of the rotation blade even when the rear guard is pivoted upward, as depicted in FIG. 6. Moreover, the shroud portions are provided with sufficient area to effectively contain chips and debris generated during the cutting operation. In addition, the shroud portions are configured to provide clearance for other components of the power tool when the rear guard is pivoted upward. Consequently, in one aspect, the shrouds and arms 39a, 39b, 36a, 36b may have a generally the shape of a triangle, as seen in FIG. 4A, with the rear edge of the shroud portions 39a, 39b being angled relative to the base 36. The angled rear edge avoids contact with the chip deflector 30, arm pivot mount or arm assembly of the power tool when the rear guard is pivoted upward.

Figure 7:
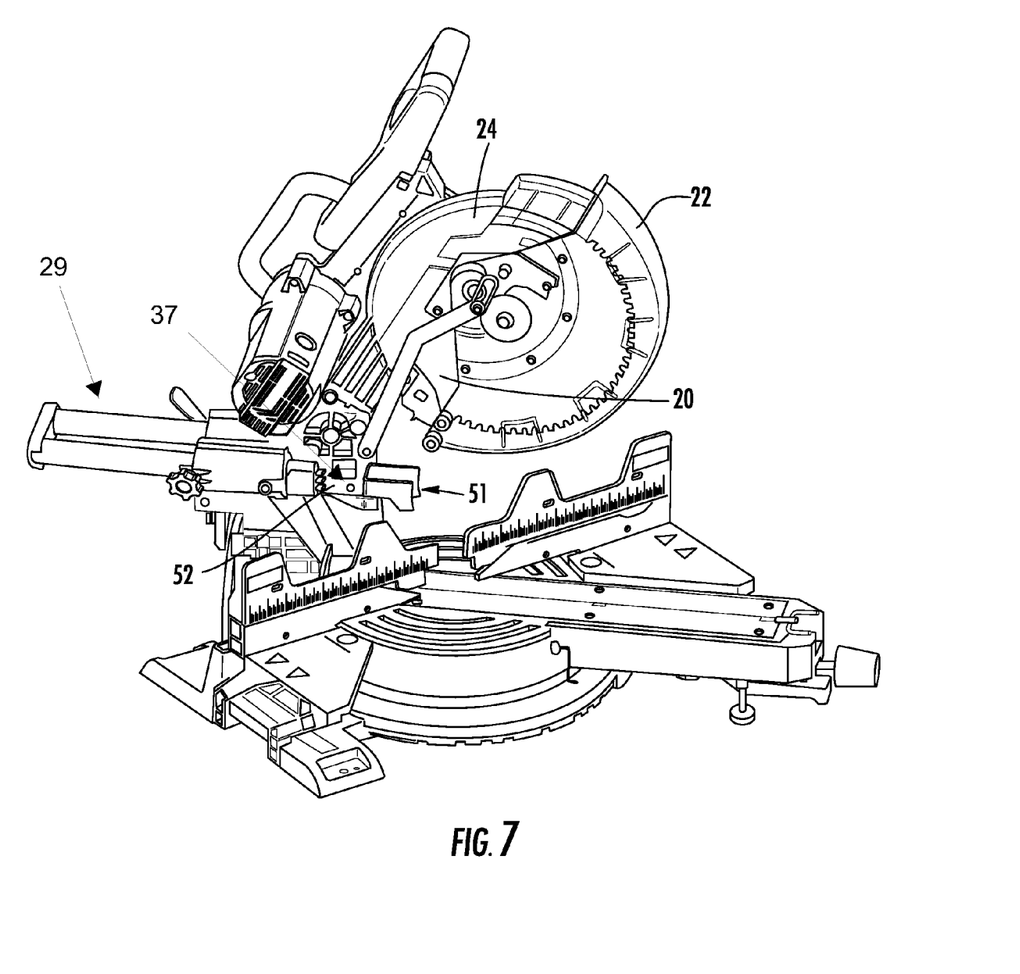
FIG. 7 is a side perspective view of a power tool, such as the power tool of FIG. 1, with a saw assembly incorporating a rear guard, such as the rear guard shown in FIG. 2, in which the saw assembly is pivoted upward prior to contacting a workpiece and the rear guard is attached to the yoke of the power tool.
Figure 8:
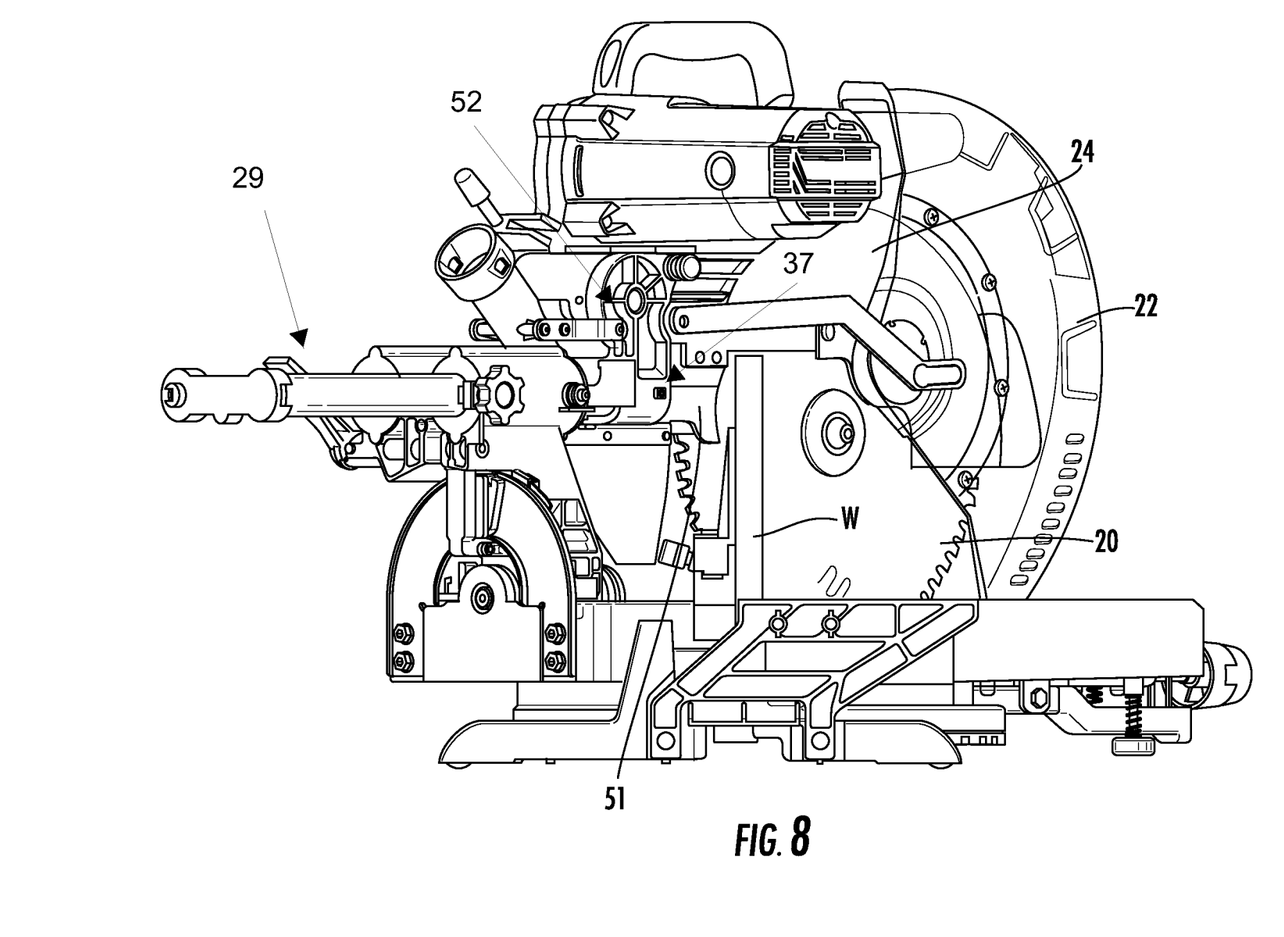
FIG. 8 is a rear perspective view of the power tool shown in FIG. 7, in which the saw assembly is pivoted downward performing a cut on a workpiece.

In an alternative embodiment shown in FIGS. 7-8, a rear guard 51 is permanently fastened to the yoke 52 of the power tool. When the arm assembly/upper guard 24 is in the retracted or "up" position, as shown in FIG. 7, the cutting zone of the blade 20 is covered by the arm assembly and the lower guard 22. When the arm assembly is in the "down" position, as shown in FIG. 8, the rear guard 51 covers the part of the cutting zone of blade 20 that is not covered by the chip deflector. As can be seen in FIG. 8, the rear guard 51 performs its protection function without interfering with the workpiece W. In a modified embodiment, the rear guard may be integrally formed with the yoke.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A safety component for a power saw, the power saw having platform for supporting a workpiece, a rotating cutting blade, a slide assembly with a yoke mounted for horizontal movement relative to the platform, an arm assembly supporting the cutting blade, an arm pivot mount pivotably supporting the arm assembly on the yoke for pivoting the blade toward a cutting position for cutting a workpiece supported on the platform, the blade defining a midline that is parallel to the platform when the blade is in the cutting position, an upper guard on the arm assembly configured to protect the operator from the top portion of the cutting blade, and a lower guard configured to protect the operator from a rear portion of the cutting blade, the safety component comprising:
  a rear guard including a base portion and a pair of arms extending from the base portion and spaced apart to form a generally U-shape defining an opening for receiving the cutting blade between the arms; and
  a safety component pivot mount configured to mount the rear guard to the yoke such that the rear guard is pivotably mounted relative to the arm assembly to receive a rear portion of the cutting blade adjacent the arm pivot mount when the rear guard is in a deployed position;
  wherein the rear guard is configured so that a lower edge of each arm of the rear guard lies along the midline of the blade when the rear guard is in the deployed position;
  wherein each arm includes a shroud portion extending from each arm and configured to overlap at least a portion of the cutting blade when the rear guard is in the deployed position receiving the cutting blade, said shroud portion sized to prevent operator contact with the cutting blade; and
  wherein at least one of said arms includes a finger extending generally radially outward from the safety component pivot mount toward the cutting blade, the finger sized and arranged to contact a workpiece supported on the platform, whereby as the cutting blade is pivoted downward onto the workpiece the finger and the rear guard are pivoted upward relative to the cutting blade.

2. The safety component of claim 1, wherein each arm includes a finger configured to contact the workpiece.

3. The safety component of claim 1, wherein said safety component pivot mount includes a biasing spring configured to bias the rear guard to the deployed position.

4. The safety component of claim 1, in which the power saw includes a chip deflector mounted to a rear portion of the arm assembly, wherein the safety component pivot mount is configured to pivotably mount the rear guard to the chip deflector.

5. The safety component of claim 1, wherein said safety component pivot mount is configured to pivotably mount the rear guard to the yoke.

6. The safety component of claim 1, wherein said safety component pivot mount is configured to rigidly mount the rear guard to the yoke.

7. The safety component of claim 1, wherein said finger is sized to overlap the saw blade by about two (2) inches when the rear guard is in the deployed position.

8. A safety component for a power saw, the power saw having platform for supporting a workpiece, a rotating cutting blade, an arm assembly supporting the cutting blade, an arm pivot mount pivotably supporting the arm assembly on the platform for pivoting the blade toward a workpiece supported on the platform, a chip deflector mounted to a rear portion of the arm assembly, an upper guard on the arm assembly configured to protect the operator from the top portion of the cutting blade, and a lower guard configured to protect the operator from a rear portion of the cutting blade, the safety component comprising:
  a rear guard including a base portion and a pair of arms extending from the base portion and spaced apart to form a generally U-shape defining an opening for receiving the cutting blade between the arms; and
  a safety component pivot mount configured to mount the rear guard to the chip deflector such that the rear guard is pivotably mounted relative to the arm assembly to receive a rear portion of the cutting blade adjacent the arm pivot mount when the rear guard is in a deployed position
  wherein each arm includes a shroud portion extending from each arm and configured to overlap at least a portion of the cutting blade when the rear guard is in the deployed position receiving the cutting blade, said shroud portion sized to prevent operator contact with the cutting blade;
  wherein at least one of said arms includes a finger extending generally radially outward from the safety component pivot mount toward the cutting blade, the finger sized and arranged to contact a workpiece supported on the platform, whereby as the cutting blade is pivoted downward onto the workpiece the finger and the rear guard are pivoted upward relative to the cutting blade; and
  wherein the shroud portion is defined by a substantially triangular shape, a rear edge of the shroud portion opposite a lower edge of the rear guard and facing toward the base portion of the rear guard being angled relative to the base portion such that the shroud portion avoids contact with the chip deflector as the rear guard is pivoted upward relative to the cutting blade.

* * * * *